United States Patent [19]

Müller et al.

[11] Patent Number: 5,698,174
[45] Date of Patent: Dec. 16, 1997

[54] PROCESS FOR SEPARATING FULLERENES

[75] Inventors: Wolfgang Müller, Wiesbaden; Richard Bröll, Langen; Eckhard Weber, Liederbach; Johann Daimer, Mörfelden; Roland Müller, Bonn, all of Germany

[73] Assignee: Hoechst Aktiengesellschaft, Frankfurt, Germany

[21] Appl. No.: 387,709

[22] PCT Filed: Sep. 3, 1993

[86] PCT No.: PCT/EP93/02378

§ 371 Date: May 31, 1995

§ 102(e) Date: May 31, 1995

[87] PCT Pub. No.: WO94/06715

PCT Pub. Date: Mar. 31, 1994

[30] Foreign Application Priority Data

Sep. 16, 1992 [DE] Germany ............ 42 30 915.8

[51] Int. Cl.[6] .................................................. C01B 31/00
[52] U.S. Cl. ........................................ 423/445 B; 210/656
[58] Field of Search .............. 423/445 B, DIG. 39; 210/656

[56] References Cited

U.S. PATENT DOCUMENTS 5,098,784 3/1992 Ichikawa et al. ............ 210/656
5,227,038 7/1993 Smalley et al. ............ 423/445 B
5,310,532 5/1994 Tour et al. .............. 423/445 B

FOREIGN PATENT DOCUMENTS

WO 93/01128 1/1993 WIPO.

OTHER PUBLICATIONS

Kremenskaya, I.N., et al., "Isolation of Individual Fullerenes ..." Mendeleev Communications, vol.1, (1993), p.9. (May 3, 1993).

Pang, L.S.K. et al., "Fullerenes from Coal: A Self–Consistent Preparation and Purification Process" Energy & Fuels, 1992, 6, pp. 176–179 (Mar., 1992).

Meier, M.S. et al., "Efficient Preparative Separation of $c_{60}$ . . ." J. Org. Chem. 1992, 57, pp. 1924–1926.

Vassallo, A.M. et al., "Improved Separation of Fullerene–60 and 70" J. Chem. Soc. Commun. 1992, No. 1, pp. 60–61 (Jan. 1992).

*Primary Examiner*—Steven Bos
*Assistant Examiner*—Peter T. DiMauro
*Attorney, Agent, or Firm*—Curtis, Morris & Safford, P.C.

[57] ABSTRACT

The invention relates to a process for the chromatographic separation of fullerenes using a nonpolar aromatic solvent as eluant. Coke, anthracite and/or graphite are used as support material. The nonpolar solvent is the main constituent of the eluant.

6 Claims, No Drawings

PROCESS FOR SEPARATING FULLERENES

Starting out from fullerene black, for example from electric arc plants, the fullerenes $C_{60}/C_{70}$ and traces higher fullerenes can be isolated by extraction, preferably using toluene (R. Haufler J. Phys. Chem. 94, 8634 (1990)). Liquid chromatography (LC) in particular is then employed for separating fullerenes on a preparative scale. The stationary phase used here is silica gel, modified silica gels such as Pirkle phase or reversed-phase silica gels, aluminum oxide or graphite columns (A. Vassallo et al. J. Chem. Soc. Chem. Commun. 1992, 60). However, a satisfactory separation can only be achieved on these columns using solvent mixtures. Thus, for example, the aluminum oxide and also the graphite column are operated using a mixture of hexane (about 90%) and toluene (about 10%), but in contrast a reversed-phase silica column has to be eluted using toluene/alcohol or toluene/acetonitrile.

For an economical total process for isolating pure $C_{60}$ or $C_{70}$, it would be advantageous if extraction and chromatographic separation could be carried out using the same solvent. This should preferably be done using a solvent in which fullerenes are readily soluble, e.g. toluene.

The use of eluants having a low toluene content (e.g. toluene:hexane=10:90) is frequently problematical, since the extracts may crystallize on the column shortly after application and can hardly be redissolved during the course of chromatography, since the solubility of fullerenes in toluene mixtures, for example hexane:toluene=9:1, is significantly less than in pure toluene. For this reason, only a relatively small amount of fullerene can be applied to the column.

The use of pure toluene as eluant would significantly increase the loading of the separation column with crude fullerenes. Crystallization on the column would thus be able to be effectively prevented. In addition, the loading of the separation column would be able to be further increased if it were possible to carry out chromatography using toluene as eluant at elevated temperature.

M. Meier (JOC 1992, 57, 1924) was able to carry out the $C_{60}/C_{70}$ separation using the system: Ultrastyragel (gel permeation material)/100% toluene. However, this process requires a very expensive column material which is normally used only for analytical purposes. Furthermore, the elution curve has no baseline separation.

It has now surprisingly been found that the chromatographic separation of fullerenes using nonpolar solvents as eluant in which the fullerene is readily soluble can be carried out using coke, anthracite and/or graphite as support material.

The invention accordingly provides a process for the chromatographic separation of fullerenes using a nonpolar aromatic solvent as eluant, wherein the support material used is coke, anthracite and/or graphite and the nonpolar aromatic solvent is the main constituent of the eluant.

Using the process, it is possible to separate, in particular, $C_{60}$ from $C_{70}$ fullerenes or $C_{60}$ and/or $C_{70}$ from other, preferably higher fullerene fractions. The fullerene material to be separated is obtained by preparation of fullerene black in an electric arc process and subsequent extraction with a nonpolar organic solvent (crude fullerene) as described, for example, in WO 92/04279. The crude fullerene can advantageously be separated off continuously by means of a decanter or in a batch process.

The support material coke, anthracite and graphite is, owing to its microstructure, crystal modification and porosity, particularly suitable for the described separation of fullerenes.

The following carbon materials are suitable for this purpose:

I) cokes based on petroleum pitches and coal pitches;
II) cokes produced via a mesophase;
III) cokes based on soot;
IV) anthracite;
V) graphites based on I)–III);
VI) mixtures of the above classifications.

The ash content of the support materials should, owing to possible interactions, be limited, for example to <1–0.1%, with it being possible for higher values to still be tolerable. Which values are tolerable can be determined in simple experiments without inventive effort.

The carbon materials have to he introduced in milled form; the milling should not be too coarse (separation insufficiently sharp) and not too fine (flow resistance too great). For example, a preferred suitable material is one having a mean particle size (50%≦ . . . ) of about 10–40 μm at a bulk density of about 0.4–0.6 g/cm$^3$ and tamped density of 0.8–1.1 g/cm$^3$.

Solvents used are aromatic solvents, preferably aromatic hydrocarbons. Particular preference is given to using benzene, toluene, xylenes, mesitylene, ($C_2$–$C_4$)-alkylbenzenes, tetralin, naphthalene, 1- and/or 2-methylnaphthalene, ($C_2$–$C_4$)-alkylnaphthalene, anisole, phenetole, nerolin, ethoxynaphthalene and also fluoro-, chloro-, dichloro-, trichloro- and bromobenzene. Particular preference is given to using toluene and/or benzene.

The specified solvents can also he admixed with non-aromatic solvents, with the aromatic solvent always having to he the main constituent.

Crude fullerene extracts can, on the one hand, be applied to the column in the form of saturated solutions (e.g. at 22° C., about 3–4 g/l of $Ce_{60}$ and 0.8–1.5 g/l of $C_{70}$). On the other hand, the crude fullerene powder, washed with diethyl ether, can be brought directly onto the column. This variant is always used when separations are to be carried out at high temperature and maximum loading of the column.

The chromatography can be carried out in the low-, intermediate- or high-pressure range, preferably in a temperature range of 20°–80° C. The process is preferably carried out in the low-pressure range up to a maximum of about 2 bar.

Using the process of the invention, fullerenes can be separated without decomposition. 98% of the fullerenes applied to the column are recovered in the separated fractions.

EXAMPLE 1

800 g of SIGRI graphite HR 70 (comprising ⅔ anthracite and ⅓ petroleum graphite having a mean particle size of 38 μm, a bulk density of 0.52 g/cm$^3$ and a main density of 0.89 g/cm$^3$) are slurried in toluene and after pouring into the column are compacted under 0.5 bar. 250 ml of crude fullerene solution are introduced onto the column. The solution contains 775 mg of $C_{60}$, 325 mg of $C_{70}$ and ~14 mg of higher fullerenes or fullerene oxides.

Elution is subsequently carried out using toluene at 0.5–0.1 bar, with the fraction collected being changed after every 1000 ml.

$C_{60}$ (100% pure) could be separated off in a total yield of 97% in the first two fractions.

The subsequent mixed fraction contains $C_{60}/C_{70}$ in a ratio of 25:75.

All further fractions contain $C_{70}$ in purities of 94–98%. The elution of $C_{70}$ can be additionally accelerated by column heating.

EXAMPLE 2

Good results are also given by a calcined petroleum coke. The milled material has a mean particle size of 25 µm, with 10% passing a 3 µm sieve and 90% passing an 80 µm sieve, and a bulk density of 0.54 g/cm³. The column material is used as described in Example 1.

EXAMPLE 3

A graphitized coke derived from bituminous coal tar pitch is milled to a mean particle size of 20 µm, with 10% passing a 3 µm sieve and 90% passing a 70 µm sieve, and a bulk density of 0.48 g/cm³. The column material is used as described in Example 1.

EXAMPLE 4

4 l of crude fullerene solution ($C_{60}$ 2.7 g/l, $C_{70}$ 0.8 g/l) are introduced onto a 35 l column (HR 70/toluene) and eluted over a period of 65 hours using 150 l of toluene. The $C_{60}$ fraction (with $C_{60}$>99%) was present in a total of 26 l, 10 l were obtained as a low-concentration mixed fraction, while $C_{70}$ (with $C_{70}$ 94%) was present in the remaining 114 l.

EXAMPLE 5

10 l of crude fullerene solution ($C_{60}$ 26.3 g and $C_{70}$ 13.8 g) are introduced onto a 35 l column (see Example 4). A total of 180 l of toluene is used for elution over a period of 81 hours. The flow was 1–4 l/h.

Yield: $C_{60}$: 62% $C_{70}$: 40%

EXAMPLE 6

The packing materials described are poured as a toluene slurry into 500 ml columns and are compacted under 0.5 bar gauge pressure. After introducing the crude fullerene solution, chromatography is carried out using 100% toluene at 0.05–0.1 bar. The results are shown in the following table.

TABLE

|  | Mixture applied | | Separated fractions | | | |
| --- | --- | --- | --- | --- | --- | --- |
|  | $C_{60}$ mg + | $C_{70}$ mg | $C_{60}$ mg | % | $C_{70}$ mg | % |
| Petroleum coke | 233 | 63 | 226 | 97 | 36 | 57 |
| Pitch coke | 233 | 63 | 185 | 79 | 1.4 | 2.2 |
| Petroleum graphite | 216 | 53 | 145 | 67 | — | — |
| Soot graphite | 216 | 53 | 201 | 93 | 3.2 | 6 |
| Pitch graphite | 216 | 53 | 187 | 87 | 30 | 57 |

The concentration of the $C_{60}$ fraction is, for example, in the range from 2.3 to 3 g/l. These high concentrations in the eluant can be achieved using no alternative chromatographic method.

We claim:

1. A process for chromatographic separation of an isolated fullerene from a crude solution containing a mixture of fullerenes, which process comprises:
    contacting the crude solution of fullerenes with a support material which comprises coke, or a mixture comprising both anthracite and graphite, and
    eluting an isolated fullerene in greater than 94% purity from the support material with an eluent comprising a non-polar aromatic solvent as its main component.
2. The process as claimed in claim 1, wherein the solvent used is toluene and/or benzene.
3. The process as claimed in claim 1, wherein the chromatographic separation is carried out in a temperature range from 20° to 80° C.
4. The process of claim 1 wherein the crude solution of fullerenes is a solution of fullerenes in a non-polar solvent.
5. A process for the chromatographic separation of $C_{60}$ fullerene from a crude solution containing a mixture of fullerenes which comprises:
    a) applying the crude fullerene solution to a separation system containing a column filled with coke, or a column filled with a mixture comprising both anthracite and graphite, and
    b) eluting the $C_{60}$ fullerene in greater than 99% purity from the column, with an eluent which has a non-polar aromatic solvent as its main component.
6. A process for the chromatographic separation of $C_{70}$ fullerene from a crude solution containing a mixture of fullerenes which comprises:
    a) applying the crude fullerene solution to a separation system containing a column filled with coke, or a column filled with a mixture comprising both anthracite and graphite, and
    b) eluting the $C_{70}$ fullerene in 94–98% purity from the column, with an eluent which has a non-polar aromatic solvent as its main constituent.

* * * * *